US006842588B2

(12) United States Patent
Haines

(10) Patent No.: US 6,842,588 B2
(45) Date of Patent: Jan. 11, 2005

(54) CONSUMABLES/PRINTER MANAGEMENT SYSTEM WITH TASK AND CALENDAR LINKS

(75) Inventor: Robert E. Haines, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 20 days.

(21) Appl. No.: 09/733,421

(22) Filed: Dec. 8, 2000

(65) Prior Publication Data

US 2002/0071685 A1 Jun. 13, 2002

(51) Int. Cl.[7] .................... G03G 15/00
(52) U.S. Cl. .................... 399/8; 399/81
(58) Field of Search .................... 399/1, 8, 11, 24, 399/27, 79, 81, 82

(56) References Cited

U.S. PATENT DOCUMENTS 4,819,191 A * 4/1989 Scully et al.
5,125,075 A * 6/1992 Goodale et al.
5,184,179 A * 2/1993 Tarr et al. .................... 399/8
5,287,194 A * 2/1994 Lobiondo .................... 399/1 X
5,335,048 A * 8/1994 Takano et al. .................... 399/8
5,343,276 A * 8/1994 Yamashita et al. .................... 399/8
5,647,002 A * 7/1997 Brunson
5,657,390 A 8/1997 Elgamal et al. .................... 380/49
5,715,496 A * 2/1998 Sawada et al. .................... 399/8
5,752,125 A * 5/1998 Yamashita et al. .................... 399/8
5,841,982 A * 11/1998 Brouwer et al.
5,923,848 A * 7/1999 Goodhand et al.
6,023,593 A * 2/2000 Tomidokoro .................... 399/8
6,073,137 A 6/2000 Brown et al. .................... 707/104
6,081,900 A 6/2000 Subramaniam et al. ..... 713/201
6,108,099 A * 8/2000 Ohtani .................... 399/11
6,125,369 A 9/2000 Wu et al. .................... 707/201
6,434,571 B1 * 8/2002 Nolte

OTHER PUBLICATIONS

The Random House Dictionary of the English Language—Unabridged, Copyright 1966, p. 1141., Random House Inc., New York.

* cited by examiner

*Primary Examiner*—Sandra L. Brase

(57) ABSTRACT

A method of scheduling an event with respect to a hard copy output engine includes detecting a status of a portion of the hard copy output engine from a sensor incorporated in the hard copy output engine, composing an electronic message including the detected status and transmitting the electronic message to a scheduling engine.

16 Claims, 7 Drawing Sheets

P1
START
S1
DETECTION OF EVENT REQUIRING SCHEDULING
S2
IS SYSTEM CONFIGURED FOR ASSIGNMENT?
YES
NO
TRANSMIT ELECTRONIC MESSAGE TO TARGET PARTY
S3
S4
TRANSMIT ELECTRONIC MESSAGE TO GROUP LIST
DYNAMICALLY UPDATE STATUS OF TASK/APPOINTMENT
S5
REVIEW STATUS
S6
END

INBOX

FOLDER LIST ×

⊟ Outlook Today–(Mailbox)

| FROM | SUBJECT | SENT |
|---|---|---|
| dfernandez@hp.com | Meetings | THU 3/16/00 4:57PM |
| ksterling@hp.com | Supplies | THU 3/16/00 3:58PM |
| jmalone@hp.com | Litigation | THU 3/16/00 3:08PM |
| rsaldivia@hp.com | Staff Meeting | THU 3/16/00 3:06PM |
| cpratt@hp.com | Pink Paper | THU 3/16/00 2:03PM |

Figure 5:
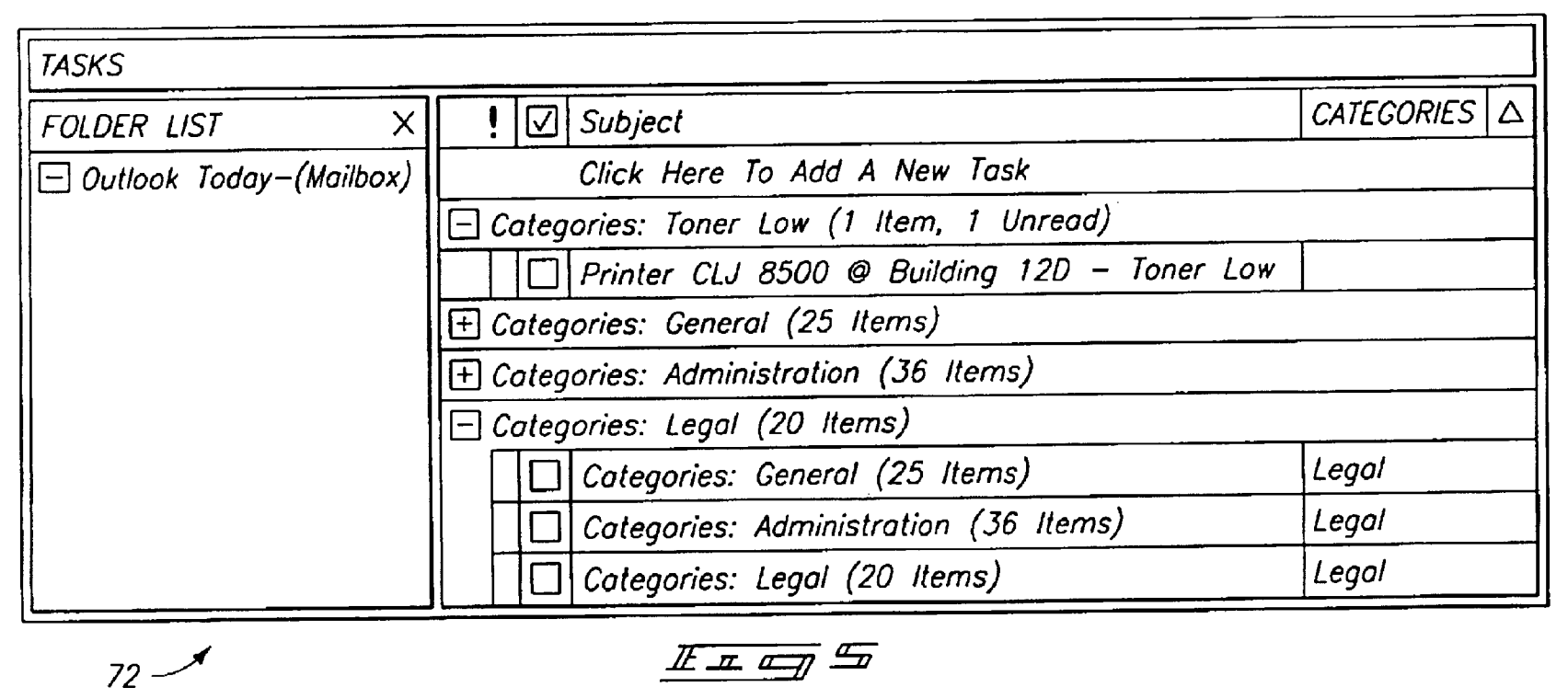

TASKS
FOLDER LIST
Outlook Today–(Mailbox)
! Subject CATEGORIES
Click Here To Add A New Task
Categories: Toner Low (1 Item, 1 Unread)
Printer CLJ 8500 @ Building 12D – Toner Low
Categories: General (25 Items)
Categories: Administration (36 Items)
Categories: Legal (20 Items)
Categories: General (25 Items) Legal
Categories: Administration (36 Items) Legal
Categories: Legal (20 Items) Legal

Figure 7:
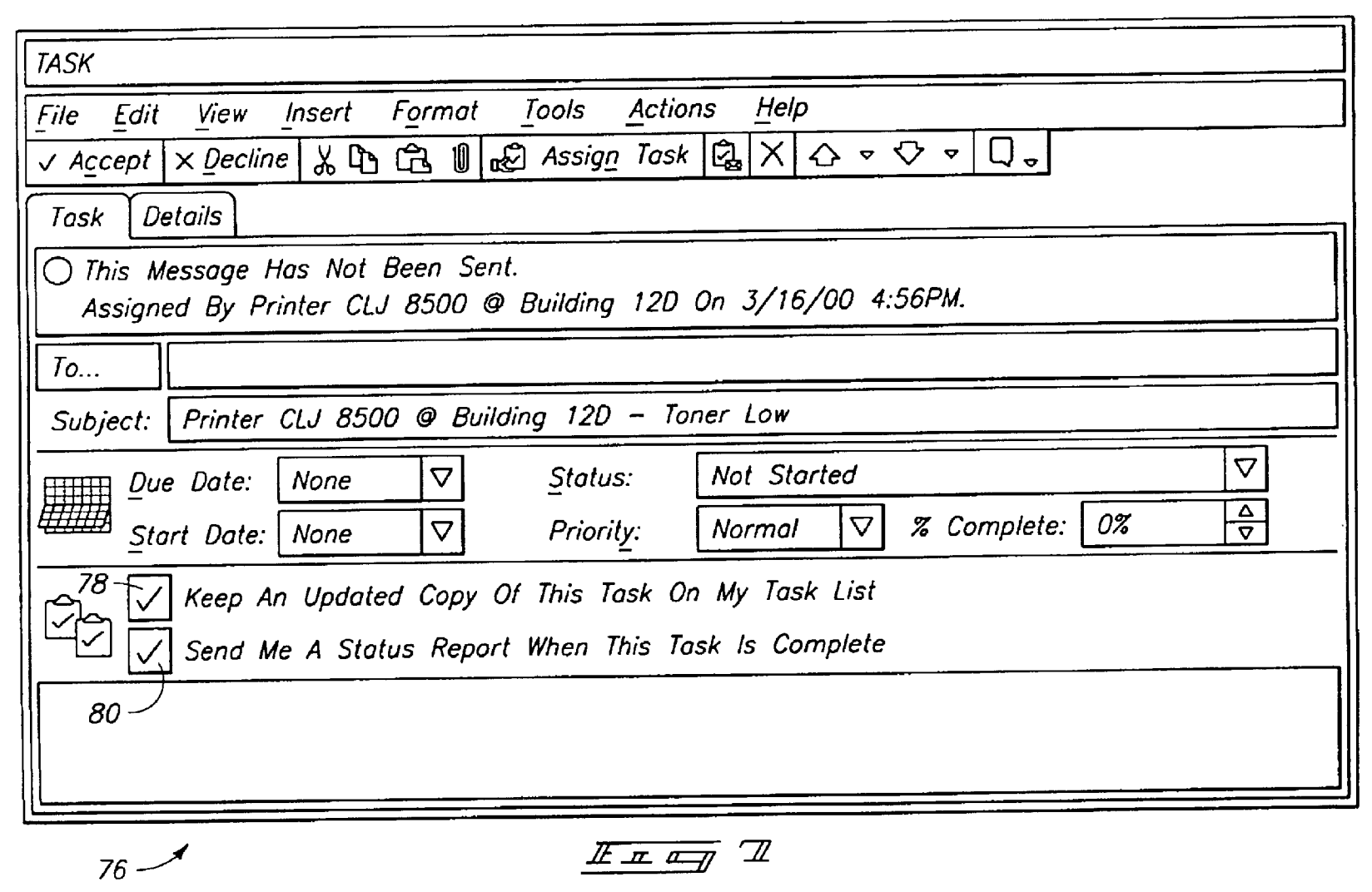

TASK

File Edit View Insert Format Tools Actions Help

✓ Accept ✕ Decline Assign Task

Task Details

This Message Has Not Been Sent.
Assigned By Printer CLJ 8500 @ Building 12D On 3/16/00 4:56PM.

To...

Subject: Printer CLJ 8500 @ Building 12D - Toner Low

Due Date: None Status: Not Started

Start Date: None Priority: Normal % Complete: 0%

Keep An Updated Copy Of This Task On My Task List

Send Me A Status Report When This Task Is Complete

CONSUMABLES/PRINTER MANAGEMENT SYSTEM WITH TASK AND CALENDAR LINKS

FIELD OF THE INVENTION

The invention relates to printers and other hard copy output engines. More particularly, the invention relates to a consumables/printer management system with task and calendar links.

BACKGROUND OF THE INVENTION

As computer systems and data communications systems have developed, the number and variety of hard copy output engines employed in a typical office or factory setting has grown. Examples include photo copiers, facsimile machines, printers and devices including more than one of these capabilities. In turn, this has led to a need to be able to order greater amounts of consumable supplies, some of which are specific to specific types of hard copy output engines.

As need for these types of hard copy output engines has grown, a number of different manufacturers have developed different hard copy output engines providing different operational characteristics and capabilities. While some consumable commodities associated with these devices are common to most or all such devices (e.g., standardized paper sizes), other consumable commodities, such as toners and toner supply cartridges or ink reservoirs, tend to be unique to a specific manufacturer and may be unique to a specific product line from that manufacturer. Additionally, different hard copy output engines may have different paper capacities, capabilities for accepting more or fewer paper sizes and different toner or other pigment supply requirements and capacities.

It is generally helpful to have a mechanism for scheduling and tracking orders of consumable commodities and/or service in keeping computer systems functional. For example, it is extremely helpful to ensure that adequate supplies of replacement paper and toner or ink are available when needed. Additionally, billing for usage of hard copy engines may require costs to be split in various ways, which may be difficult to keep track of.

Coordination of orders for supplies can be very helpful to avoid over- or under-stocking of these consumable commodities, while still achieving the benefits of economies of scale by pooling orders to service multiple hard copy output engines, especially those using at least some of the same consumable commodities. However, in many business settings, the sheer number of diverse hard copy output engines being used in different aspects or divisions of the business may lead to confusion in maintaining adequate supplies of these consumable commodities and in scheduling replacement of consumable commodities as well as scheduling preventative maintenance.

What is needed is a way to facilitate scheduling replacement of consumable commodities, as well as scheduling preventative maintenance, for one or more hard copy output engines that are included in a network.

SUMMARY OF THE INVENTION

In accordance with an aspect of the present invention, a method of scheduling an event with respect to a hard copy output engine includes detecting a status of a portion of the hard copy output engine from a sensor incorporated in the hard copy output engine, composing an electronic message including the detected status and transmitting the electronic message to a scheduling engine.

In accordance with another aspect of the present invention, an article of manufacture includes a computer usable medium having computer readable code embodied therein. The computer readable code is configured to cause a processor to detect a status of a portion of the hard copy output engine from a sensor incorporated in the hard copy output engine, compose an electronic message including the detected status and transmit the electronic message to a scheduling engine.

In accordance with yet another aspect of the present invention, a computer implemented control system for a hard copy output engine includes a sensor coupled to a portion of the hard copy output engine. The sensor is configured to provide a status of the portion of the hard copy output engine that it is coupled to. The system also includes processing circuitry coupled to the sensor. The processing circuitry is configured to detect the status of the portion, compose an electronic message including the detected status and transmit the electronic message to a scheduling engine.

Other features and advantages of the invention will become apparent to those of ordinary skill in the art upon review of the following detailed description, claims and drawings.

DESCRIPTION OF THE DRAWINGS

FIGS. 4–7 are depictions of exemplary steps in the scheduling/tracking process for tasks or appointments of FIG. 3, in accordance with an embodiment of the present invention.

DETAILED DESCRIPTION OF THE INVENTION

Figure 1:
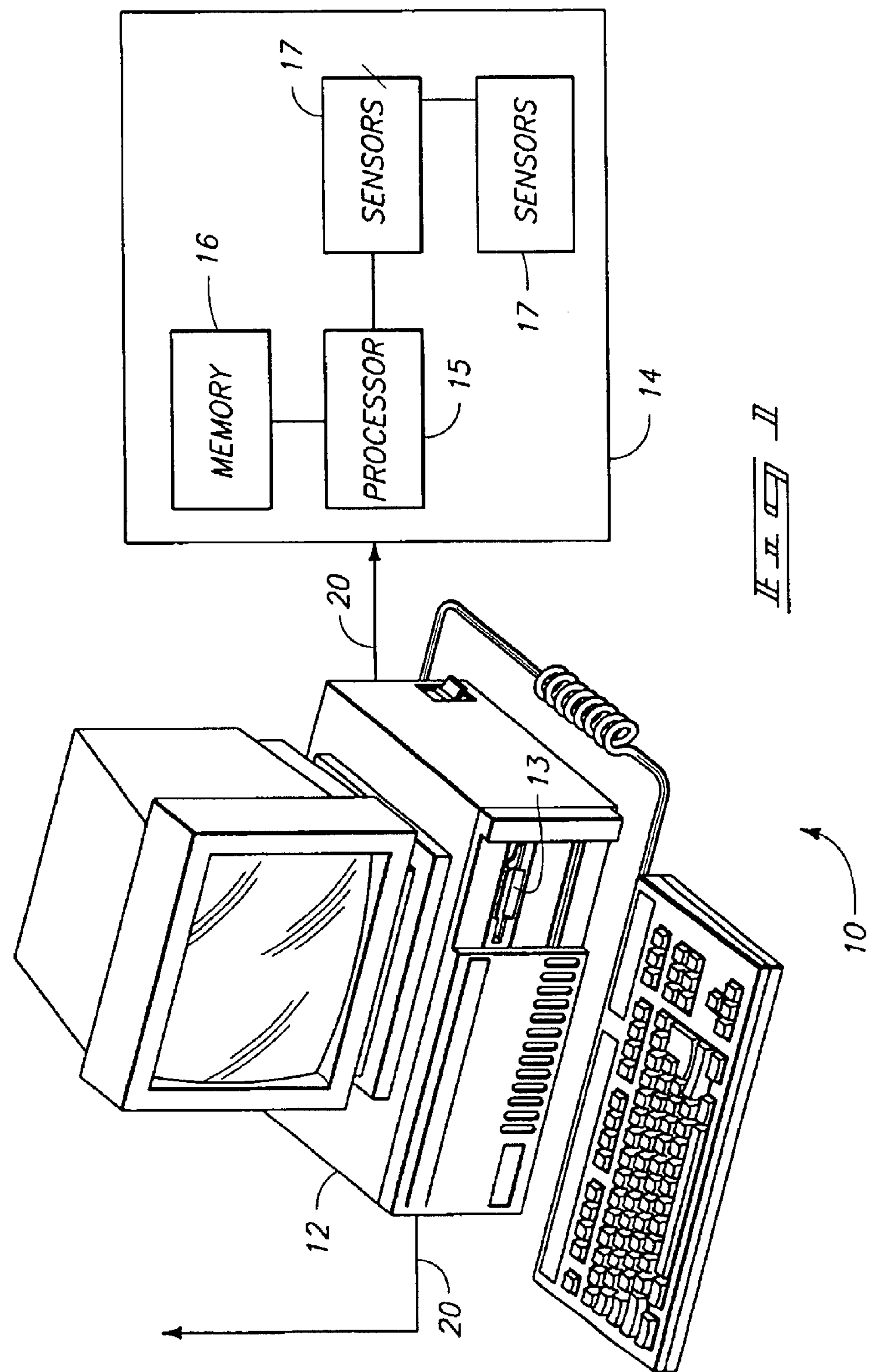
FIG. 1 is a simplified block diagram of a computer network including a computer and a hard copy output engine, in accordance with an embodiment of the present invention.

FIG. 1 is a simplified block diagram of a computer network 10 including a computer 12 having a floppy disc drive 13. The network 10 also includes a hard copy output engine 14, in accordance with an embodiment of the present invention. The hard copy output engine 14 includes a controller 15, such as a conventional microprocessor or microcontroller. The hard copy output engine 14 also includes a memory 16 in data communication with the controller 15 and one or more sensors 17 coupled to the controller 15. The memory 16 is configured to embody computer readable code for configuring the processor 15 to carry out various operations and may include an electrically alterable read only memory (EAROM), electrically programmable read only memory (EPROM), a write-once, read-many memory (WORM), magnetic, magneto-optic or optical storage media, such as conventional disc storage or floppy disc data storage units, or CD-ROMs or the like, and may include read/write memory such as DRAMs or SRAMs.

The computer 12 is coupled to the hard copy output engine 14 via a data path such as a bus 20 allowing either the computer 12 or the hard copy output engine 14 to initiate data communications with the other. In one embodiment, the hard copy output engine 14 is a device such as a printer, copier, facsimile machine, or a multifunction device capable of providing two or more such functions. In one embodiment, the system 10 is coupled to other external devices (not shown in FIG. 1) via the bus 20.

In one embodiment, the bus 20 includes an intranet. In one embodiment, the bus 20 includes a local area network (LAN) or wide area network (WAN). In one embodiment, the bus 20 includes access to the Internet. In one embodiment, the computer 12 and the hard copy output engine 14 are capable of exchanging data via a protocol compatible with presence of other computers 12 or hard copy output engines 14 on the bus 20. In one embodiment, the computer 12 and the hard copy output engine 14 employ an object-oriented request-reply protocol supporting asynchronous printer query, control and monitor capabilities, and that is capable of documenting the requests, replies and data types supported by the protocol.

In one embodiment, the bus 20 provides common gateway interface (CGI) data communication capability. In one embodiment, the bus 20 includes an email capability (e.g., simple mail transfer protocol or SMTP) for facilitating data communication. In one embodiment, the bus 20 includes a secure data path using HTTP (hyper text transfer protocol) with SSL (secure sockets layer), as is described in more detail in U.S. Pat. No. 5,657,390, entitled "Secure Socket Layer Application Program Apparatus And Method", issued to Elgamal et al. and U.S. Pat. No. 6,081,900, entitled "Secure Intranet Access" and issued to Subramanian et al., which patents are hereby incorporated herein by reference for their teachings.

The sensors 17 are coupled to consumable commodities associated with the hard copy output engine 14. In one embodiment, when the sensors 17 report that a quantity of a consumable commodity (e.g., paper, toner or ink) associated with the hard copy output engine 14 has decreased to below a predetermined threshold amount, or that malfunction of a dispenser of a consumable commodity exists, the controller 15 initiates a data communication ultimately intended for transmission via the data path 20, as is described below in more detail with reference to FIG. 3. Alternatively or additionally, the sensors 17 may log hours of operation and/or loading (such as number of pages handled) in order to determine when preventive maintenance is appropriate, or may report other malfunction of the hard copy output engine 14.

Figure 2:
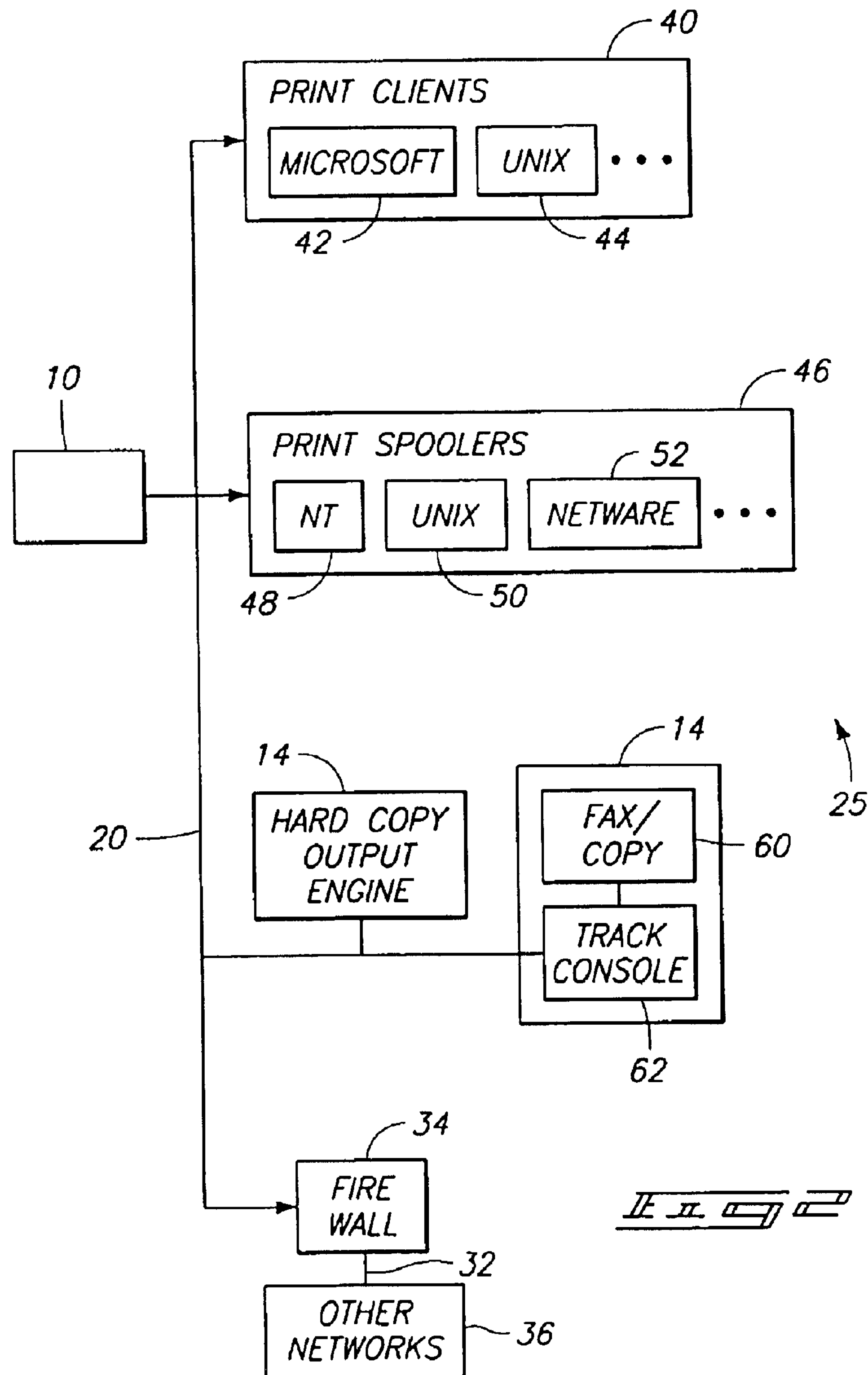
FIG. 2 is a simplified block diagram of a computer network including multiple hard copy output engines, in accordance with an embodiment of the present invention.

FIG. 2 is a simplified block diagram of a computer network or system 25 including multiple hard copy output engines 14, in accordance with an embodiment of the present invention. The network 25 of FIG. 2 includes a link 32, which may include a firewall 34, to other networks 36, which may be internal or external. The network 25 also may include print clients 40, such as Microsoft 42 and/or Unix 44, as well as others. The network 25 may further include print spoolers 46, such as NT 48, Unix 50 and/or Netware 52, as well as others. The network 25 may also include a plurality of hard copy output engines 14, which may include printers as well as facsimile/copier 60 and track console 62.

The track console 62 normally tracks usage of the facsimile/copier unit 60 and records data pertinent thereto. Track consoles 62 are manufactured by a variety of corporations including Equitrack of Coral Gables, Fla. and Copytracks. Track consoles typically facilitate data collection for allocation of billings associated with use of a particular hard copy output engine 14 for the benefit of a specific client.

In one embodiment, the print clients 40 and the print spoolers 46 are coupled via the bus 20 to other data processing equipment (not shown), where the bus 20 is configured for data communication using HTTP, although other protocols may be used. In one embodiment, a different protocol, such as SNMP, is used, although other protocols may be used.

In general, it is desirable to obtain data directly from a hard copy output engine 14 because this does not require modification of the network software.

In one embodiment, the link 32 comprises an intranet. In one embodiment, the link 32 accommodates HTTP for data communication.

Providing usage and status information relative to the print clients 40, the print spoolers 46 and the individual hard copy output engines 14 can permit more effective and timely ordering of consumables and preventative maintenance for hard copy output engines 14.

Figure 3:
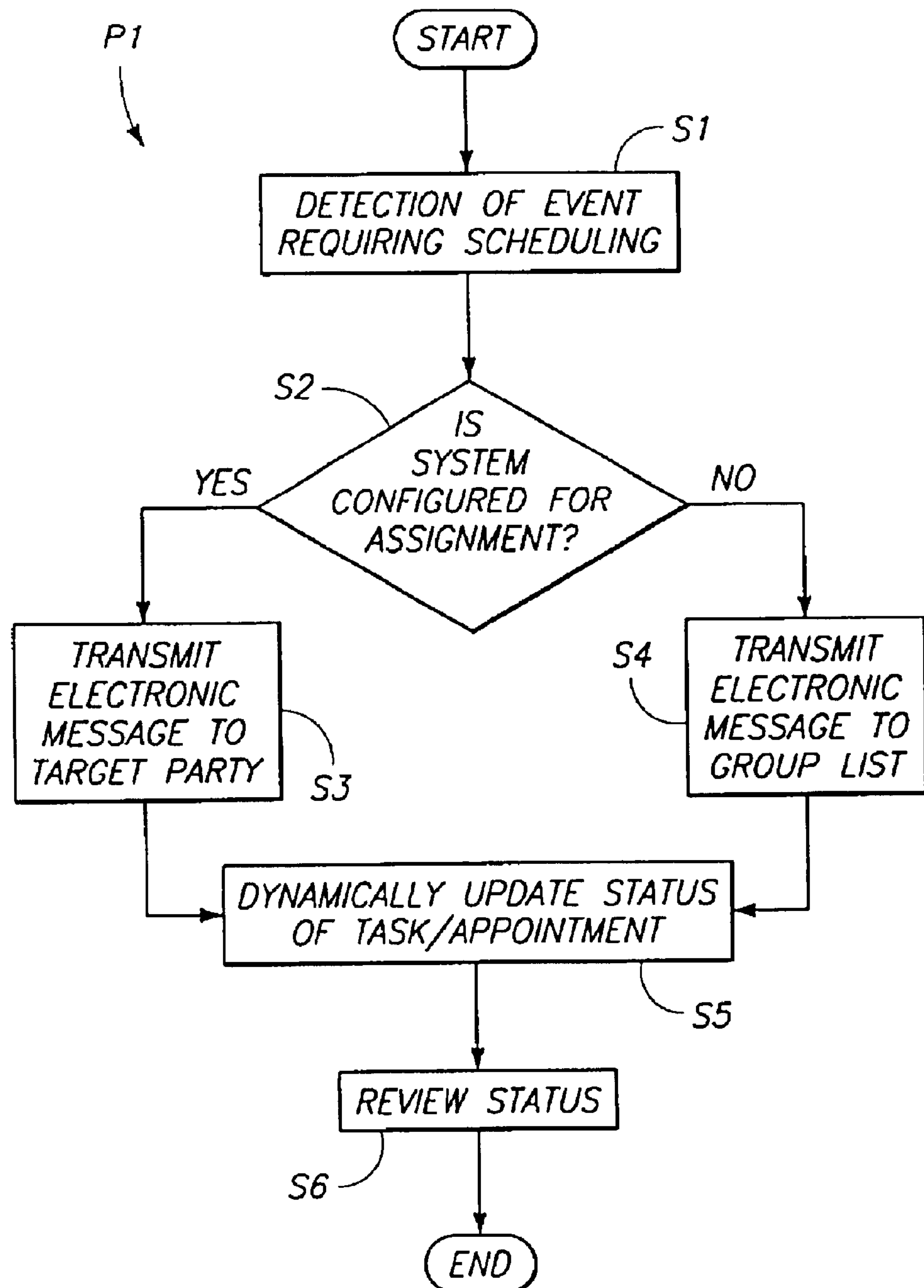
FIG. 3 is a simplified flowchart illustrating a process, in accordance with an embodiment of the present invention.

FIG. 3 is a simplified flowchart illustrating a process P1, in accordance with an embodiment of the present invention. The process P1 begins in a step S1.

In the step S1, one of the sensors 17 of FIG. 1 detects that an amount of a consumable commodity has fallen below a predetermined level. In one embodiment, a "toner low" or "toner out" condition may be detected. In one embodiment, the hard copy output engine 14 may have multiple toner cartridges or other pigment supplies in order to be able to provide color images. In one embodiment, the sensor 17 may detect that preventative maintenance needs to be scheduled. In one embodiment, the sensor 17 may determine that the hard copy output engine 14 is malfunctioning, and that an appointment for a service technician needs to be scheduled.

In one embodiment, the sensor 17 detects an event chosen from a list including: toner out, toner low, preventative maintenance alerts, including cleaning or replacement of component parts, consumables orders, internal billing dates for job accounting, external billing dates for job accounting, low or "out of" status for other consumables or need for other maintenance items.

In a query task S2, the processor 15 of FIG. 1 determines if the system 10 of FIG. 1 or the system 25 of FIG. 2 is configured to assign a person to the task or appointment that was identified in the step S1.

In one embodiment, a program such as Microsoft Outlook or Microsoft Exchange, both available from Microsoft of Redmond, Wash., may be used to schedule tasks and to accept schedule inputs via email, for example. In one embodiment, an alternative program such as Lotus Notes, available from Lotus Development Corp. of Cambridge, Mass., may be used to schedule tasks. The operation of the Outlook email product from Microsoft (Redmond, Wash.) is described in U.S. Pat. No. 6,125,369 filed on Oct. 27, 1997, entitled "Continuous object synchronization between object stores on different computers" and issued to Charles Wu and George Hu, and in U.S. Pat. No. 6,073,137, filed on Oct. 31, 1997, entitled "Method for updating and displaying the hierarchy of a data store" and issued to Alon Brown, Scott Thurlow and Steven Wells, which patents are hereby incorporated herein by reference for their teachings.

When the processor 15 determines that the system 10 or 25 is configured to assign a person the task or appointment identified in the step S1, control passes to a step S3. When the processor 15 determines that the system 10 or 25 is not configured to assign a person the task or appointment identified in the step S1, control passes to a step S4.

In the step S3, the processor 15 either sends an electronic message such as an email or causes a printer management system in the system 25 to send an electronic message such as an email, the message containing embedded information regarding the task/appointment and the specific hard copy output engine 14 to a specific person determined from the query task S2.

In the step S4, the processor 15 either sends an electronic message such as an email or causes a printer management system in the system 25 to send an electronic message such as an email containing embedded information regarding the task/appointment and the specific hard copy output engine 14 to a group list to be assigned or managed manually.

In either case, the information included in the communication or email or in the scheduling/tracking system includes information chosen from a list including indicia identifying the hard copy output engine 14, percentage complete, to whom assigned, blind carbon copy to, copy to, company addressed to, complete, date completed, defer until, due date, duration, event address, expiration date, follow-up flag, importance, owner, priority, date message was read, return receipt request status, remind beforehand, reminder, reminder override default, required attendee list, resources, sensitivity, date sent, start date, addressee, tracking status, consumables order list (e.g., part numbers and the like), maintenance items or malfunction and preventative maintenance items. Other information may also be included as appropriate.

In either case, once the information has been received and is input into scheduling/tracking software, status of the task/appointment is updated dynamically in a step S5. In one embodiment, the updating is directly analogous to calendaring of acceptance or declination of an appointment or meeting in the scheduling/tracking software.

In a step S6, status of the scheduled task or appointment may be reviewed. Optionally, users may subscribe to updates, i.e., cause the scheduling/tracking engine to send an electronic message such as an email apprizing the user of a change of status when the change occurs. Review of status may include, for example, review of task assignment, task acceptance, task completion, percentage complete, date completed and the like. When scheduling conflicts or other difficulties arise, a maintenance manager is able to review the scheduled events and to use the scheduling/tracking engine to resolve these issues. The process P1 then ends.

In one embodiment, at least a portion of the process P1 is carried out via the processor 15. In one embodiment, at least a portion of the process P1 is carried out via the computer 12. In one embodiment, at least a portion of the process P1 is carried out via a server or exchange server.

EXAMPLE

FIGS. 4–7 are depictions of exemplary steps in the scheduling/tracking process for tasks or appointments of FIG. 3, in accordance with an embodiment of the present invention.

FIG. 4 is an example of a simplified view of a graphical user interface 70 for showing how a "toner low" task might look in the Outlook scheduling/tracking engine. In this example, what is shown in an actual task that has been delegated from another user and the text has been modified accordingly. Other kinds of tasks (notice to reorder toner, schedule service for printer such as change fuser etc.) also fit within this framework.

FIG. 5 is an example of a simplified view of a graphical user interface 72 for showing how categories may be assigned to classes of tasks. Related tasks are easily grouped to allow scheduling conflicts to be identified and resolved. Assignment of tasks to classes also facilitate combining or scheduling tasks to promote efficiency.

Figure 6:
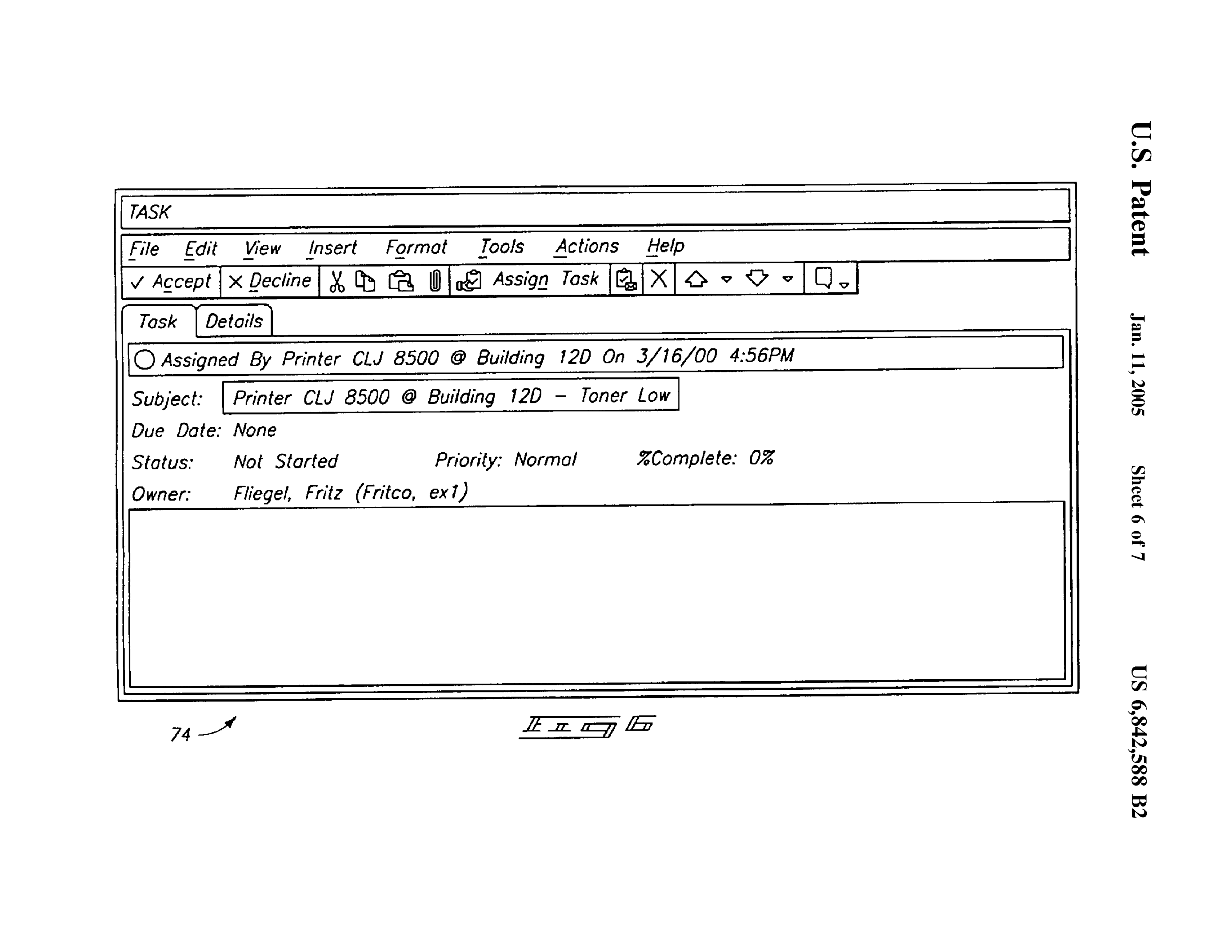

FIG. 6 is an example of a simplified view of a graphical user interface 74 for showing how tasks may be accepted, declined or delegated. The example of FIG. 6 also illustrates some of the tracking features.

FIG. 7 is an example of a simplified view of a graphical user interface 76 for showing how the hard copy output engine 14 or the hard copy output engine management utility may use the status report feature. Optional "check" boxes 78 and 80 allow selection of reporting features for specific individual tasks.

The protection sought is not to be limited to the disclosed embodiments, which are given by way of example only, but instead is to be limited only by the scope of the appended claims.

What is claimed is:

1. A method of scheduling a hard copy output engine event, comprising:

providing a hard copy output engine comprising:
- a sensor;
- a processor; and
- a memory;

sensing status information of a plurality of hard copy output engine events;

processing the status information, wherein the processing includes comparing the status information to information housed in the memory to determine if any recipients should be appointed to a task corresponding to an event; and appointing a recipient to a task, the appointing comprising: composing an electric message to the recipients that includes the status information;
- transmitting the electronic message from the hard copy output engine to a scheduling engine;
- tasking the recipient; and
- updating the status of the task.

2. The method of claim 1, wherein the status information includes at least one of a toner low or toner out status.

3. The method of claim 1, wherein information comprises one or more of percentage of remaining consumable, blind carbon copy to, copy to, company addressed to, expected completion date, defer until, due date, duration, event address, expiration date, follow-up flag, importance, owner, priority, return receipt request status, remind beforehand, reminder, reminder override default, required attendee list, resources, sensitivity, date sent, start date, addressee, tracking status, consumables order list, maintenance items, malfunction and preventative maintenance items.

4. The method of claim 1, wherein the plurality of events comprises one or more of toner out, toner low, preventative maintenance alerts, including cleaning or replacement of component parts, consumables orders, internal billing dates for job accounting, external billing dates for job accounting, low paper, out of paper, low consumables, out of consumables, and need maintenance.

5. The method of claim 1, wherein the hard copy output engine is chosen from a group consisting of: facsimile machines, photocopiers and printers.

6. The method of claim 1, wherein the electronic message includes a consumable order.

7. The method of claim 1, wherein at least one of the plurality of events comprises a future need for preventative maintenance.

8. The method of claim 1 wherein the updating comprises calendaring acceptance or declination of a task.

9. A computer implemented hard copy output engine control system, the system comprising:

a plurality of sensors adapted to be coupled to a hard copy output engine, the sensors being configured to provide status information relating to a plurality of aspects of the hard copy output engine; and processing circuitry coupled to the sensors, the processing circuitry configured to:

read the sensors and detect the status of the aspects of the hard copy output engine;

selectively look up from a memory recipients corresponding to the aspects;

schedule the recipients, the scheduling comprising composing an electronic message that includes a description of the aspect and appointing the recipient to address the aspect, wherein the appointing comprises tasking the recipient; and updating the status of the task.

10. The computer implemented control system of claim 9, wherein the aspect comprises toner amount.

11. The computer implemented hard copy output engine control system of claim 9, wherein the electronic message comprises the one or more of a percentage of remaining consumable, blind carbon copy to, copy to, company addressed to, expected completion date, defer until, due date, duration, event address, expiration date, follow-up flag, importance, owner, priority, return receipt request status, remind beforehand, reminder, reminder override default, required attendee list, resources, sensitivity, date sent, start date, addressee, tracking status, consumables order list, maintenance items, malfunction and preventative maintenance items.

12. The computer implemented hard copy output engine control system of claim 9, wherein individual ones of the aspects of the hard copy output engine include one of more of toner out, toner low, preventative maintenance alerts, including cleaning or replacement of component parts, consumables orders, low paper, out of paper, low consumables, out of consumables, and need maintenance.

13. The computer implemented hard copy output engine control system of claim 9, wherein the processing circuitry is further configured to detect a status of a hard copy output engine chosen from a group consisting of: facsimile machines, photocopiers and printers.

14. The computer implemented hard copy output engine control system of claim 9, wherein the processing circuitry is further configured to detect a future need for preventative maintenance.

15. The computer implemented control system of claim 9, wherein the processing circuitry is further configured to detect a future need for cleaning or replacement of a component part.

16. The computer implemented hard copy output engine control system of claim 9, wherein the updating comprises calendaring acceptance or declination of a task.

* * * * *

UNITED STATES PATENT AND TRADEMARK OFFICE

CERTIFICATE OF CORRECTION

PATENT NO. : 6,842,588 B2
DATED : January 11, 2005
INVENTOR(S) : Haines

It is certified that error appears in the above-identified patent and that said Letters Patent is hereby corrected as shown below:

Column 6,
Line 35, delete "electric" and insert therefor -- electronic --.

Column 8,
Line 28, delete "a" and insert therefor -- the --.

Signed and Sealed this

Twenty-eighth Day of June, 2005

JON W. DUDAS
*Director of the United States Patent and Trademark Office*